(12) United States Patent
Wakamatsu et al.

(10) Patent No.: US 8,379,303 B2
(45) Date of Patent: Feb. 19, 2013

(54) MICROSCOPE SYSTEM AND OBSERVATION CONTROL METHOD

(75) Inventors: Takashi Wakamatsu, Yokosuka (JP); Akitoshi Suzuki, Yokohama (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 13/077,162

(22) Filed: Mar. 31, 2011

(65) Prior Publication Data

US 2011/0310474 A1 Dec. 22, 2011

Related U.S. Application Data

(63) Continuation of application No. PCT/JP2009/067206, filed on Oct. 2, 2009.

(30) Foreign Application Priority Data

Oct. 2, 2008 (JP) ................ P2008-257231

(51) Int. Cl.
*G02B 21/00* (2006.01)
(52) U.S. Cl. ...................... 359/380; 359/368
(58) Field of Classification Search .......... 359/368–390, 359/676, 821
See application file for complete search history.

(56) References Cited

U.S. PATENT DOCUMENTS

| 4,643,540 A * | 2/1987 | Kawasaki et al. ............ 359/368 |
| 4,661,692 A * | 4/1987 | Kawasaki ................ 250/201.2 |
| 5,276,550 A * | 1/1994 | Kojima ................... 359/368 |
| 5,703,714 A * | 12/1997 | Kojima ................... 359/368 |
| 7,773,297 B2 * | 8/2010 | Matsukawa et al. .......... 359/380 |
| 2006/0114554 A1 | 6/2006 | Suzuki et al. |
| 2007/0273877 A1 | 11/2007 | Kawano et al. |

FOREIGN PATENT DOCUMENTS

| JP | 7-248450 | 9/1995 | |
| JP | 2004-4856 | * 1/2004 | ............ 359/368 |
| JP | 2005-17998 | 1/2005 | |
| JP | 2005-316362 | 11/2005 | |
| JP | 2006-178440 | 7/2006 | |

OTHER PUBLICATIONS

International Search Report for PCT/JP2009/067206, mailed Jan. 12, 2010.

* cited by examiner

*Primary Examiner* — Thong Nguyen
(74) *Attorney, Agent, or Firm* — Staas & Halsey LLP (57) ABSTRACT

An electric zoom consecutively changes a magnification for a sample within a magnification changeable range. An electric revolver switches an objective lens placed in an observation optical path to intermittently change the magnification for the sample. A control section calculates a total magnification based on the magnification provided by the electric zoom and the magnification of the objective lens currently placed in the observation optical path. The control section controls the electric revolver such that the objective lens placed in the observation optical path is switched when the magnification changed in response to the operation of causing the magnification of the electric zoom to be changed falls outside the magnification changeable range of the electric zoom.

6 Claims, 7 Drawing Sheets

| MAGNIFICATION OF ELECTRIC ZOOM | MAGNIFICATION OF OBJECTIVE LENS | | |
|---|---|---|---|
| | 0.5 (ADDRESS 1) | 1 (ADDRESS 2) | 2.5 (ADDRESS 3) |
| 0.7 | 0.35 | 0.7 | 1.75 |
| 0.8 | 0.4 | 0.8 | 2 |
| 0.9 | 0.45 | 0.9 | 2.25 |
| 1 | 0.5 | 1 | 2.5 |
| 1.1 | 0.55 | 1.1 | 2.75 |
| 1.2 | 0.6 | 1.2 | 3 |
| 1.3 | 0.65 | 1.3 | 3.25 |
| 1.4 | 0.7 | 1.4 | 3.5 |
| 7.4 | 3.7 | 7.4 | 18.5 |
| 7.5 | 3.75 | 7.5 | 18.75 |
| 7.6 | 3.8 | 7.6 | 19 |
| 7.7 | 3.85 | 7.7 | 19.25 |
| 7.8 | 3.9 | 7.8 | 19.5 |
| 7.9 | 3.95 | 7.9 | 19.75 |
| 8 | 4 | 8 | 20 |
| 14.5 | 7.25 | 14.5 | 36.25 |
| 14.6 | 7.3 | 14.6 | 36.5 |
| 14.7 | 7.35 | 14.7 | 36.75 |
| 14.8 | 7.4 | 14.8 | 37 |
| 14.9 | 7.45 | 14.9 | 37.25 |
| 15 | 7.5 | 15 | 37.5 |

MICROSCOPE SYSTEM AND OBSERVATION CONTROL METHOD

This application is a continuation under 35 USC 111(a) of International Application PCT/JP2009/067206, filed Oct. 2, 2009, the contents of which are incorporate herein by reference in its entirety.

TECHNICAL FIELD

The present invention relates to a microscope system and an observation control method, and in particular, to a microscope system and an observation control method configured to allow operability to be improved.

BACKGROUND ART

As a scheme for changing a total magnification at which samples are magnified for observation, microscopes conventionally adopt various schemes such as switching of an objective lens and the use of a zoom lens.

For example, in the scheme of switching the objective lens, a lens revolver with a plurality of objective lenses of different magnifications installed therein is utilized to switch the objective lens inserted into an observation optical path. Thus, the magnification can be intermittently changed simply by rotating the lens revolver. Furthermore, in the scheme utilizing the zoom lens, the magnification can be linearly changed by consecutively moving the zoom lens in a zoom ring provided that the zoom lens is moved within the movable range thereof.

Additionally, in a microscope including a lens revolver or a zoom lens, the operability of the microscope can be improved by electrically driving rotation of the lens revolver or movement of the zoom lens.

In particular, in many cases, a stereoscopic microscope with which a user observes biological samples intact uses both the scheme of switching the objective lens and the scheme utilizing the zoom lens. The stereoscopic microscope thus enables linear changes in magnification and allows widening of the range within which the magnification can be varied.

For example, Patent Literature 1 discloses a microscope system including an objective switching mechanism configured to electrically switch the objective lens and a zoom mechanism configured to move the zoom lens.

CITATION LIST

Patent Literature

[Patent Literature 1] Japanese Patent Laid-Open No. 2004-4856

SUMMARY OF INVENTION

Technical Problem

In the microscope configured to use both the scheme of switching the objective lens and the scheme utilizing the zoom lens, for example, when a user operates the zoom lens and the zoom lens reaches the upper limit of a zoom range, the magnification can no longer consecutively changed. Thus, in this case, the user needs to operate the lens revolver to perform an operation of switching to one of the objective lenses which has a higher magnification. Likewise, when the zoom lens reaches the lower limit of the zoom range, the user also needs to operate the lens revolver to perform an operation of switching to one of the objective lenses which has a lower magnification. Such operations are cumbersome.

Furthermore, when the total magnification is changed by switching the objective lens, an observation field of view changes greatly. Thus, the user is likely to miss an observation position on the sample. Specifically, when the magnification is changed using the zoom lens, the magnification is linearly changed. Hence, the user does not miss the observation position on the sample during a change in magnification. In contrast, when the magnification is changed using the objective lens, the magnification is significantly changed. Consequently, the user is likely to miss the observation position on the sample. Therefore, such a microscope is difficult to handle smoothly unless the user is skilled in handling of the microscope.

The present invention has been developed in view of the above-described circumstances, and allows the operability to be improved.

Solution to Problem

A microscope system according to the present invention is configured to magnify a sample for observation and includes a zoom instructing section for changing a magnification for the sample, a zoom section for consecutively changing the magnification for the sample within a predetermined magnification changeable range in accordance with an instruction from the zoom instructing section, a switching section including a plurality of objective lenses of different magnifications and for switching the objective lens placed in an observation optical path to intermittently change the magnification for the sample, a switching control section for controlling the switching section such that the objective lens placed in the observation optical path is switched, if the zoom instructing section performs an operation of causing the magnification to be changed and when the magnification changed in response to the operation falls outside the magnification changeable range of the zoom section, a zoom magnification determining section for determining the magnification (target magnification) of the zoom section required to keep a total magnification obtained after the switching of the objective lens equal to the total magnification obtained before the switching of the objective lens, and a zoom control section for controlling the zoom section such that the magnification of the zoom section is set equal to the target magnification determined by the zoom magnification determining section.

An observation control method according to the present invention is used for a microscope comprising a zoom section configured to consecutively change a magnification within a predetermined magnification changeable range and a plurality of objective lenses of different magnifications, to magnify a sample for observation, and includes specifying a zoom magnification causing a magnification for the sample to be changed, causing the zoom section to consecutively change the magnification for the sample in accordance with the specification of the zoom magnification, switching an objective lens placed in an observation optical path to intermittently change the magnification for the sample, switching an objective lens placed in the observation optical path, if an operation causing the magnification to be changed is performed in response to the specification of the zoom magnification and when the magnification changed in response to the operation falls outside the magnification changeable range of the zoom section, determining a magnification (target magnification) of the zoom section required to keep a total magnification obtained after the switching of the objective lens equal to the total magnification obtained before the switching of the objective lens, and controlling the zoom section such that the magnification of the zoom section is set equal to the determined target magnification.

In the microscope system and the observation control method according to the present invention, in accordance with an instruction for changing the magnification for the sample, the zoom section consecutively changes the magnification for the sample within the predetermined magnification changeable range and switches the objective lens placed in the observation optical path to intermittently change the magnification for the sample. Furthermore, if the instruction for zoom magnification performs the operation of changing the magnification, when the magnification obtained after the change corresponding to the operation falls outside magnification changeable range of the zoom section, the switching means is controlled to switch the objective lens placed in the observation optical path. Then, the magnification (target magnification) of the zoom section required to keep the total magnification obtained after the switching of the objective lens equal to the total magnification obtained before the switching of the objective lens is determined. The zoom section is then controlled to set the magnification of the zoom section equal to the target magnification.

Advantageous Effects of Invention

The microscope system and the observation control method according to the present invention allow the zoom operability to be improved.

DESCRIPTION OF EMBODIMENTS

A specific embodiment to which the present invention is applied will be described below in detail with reference to the drawings.

Figure 1:
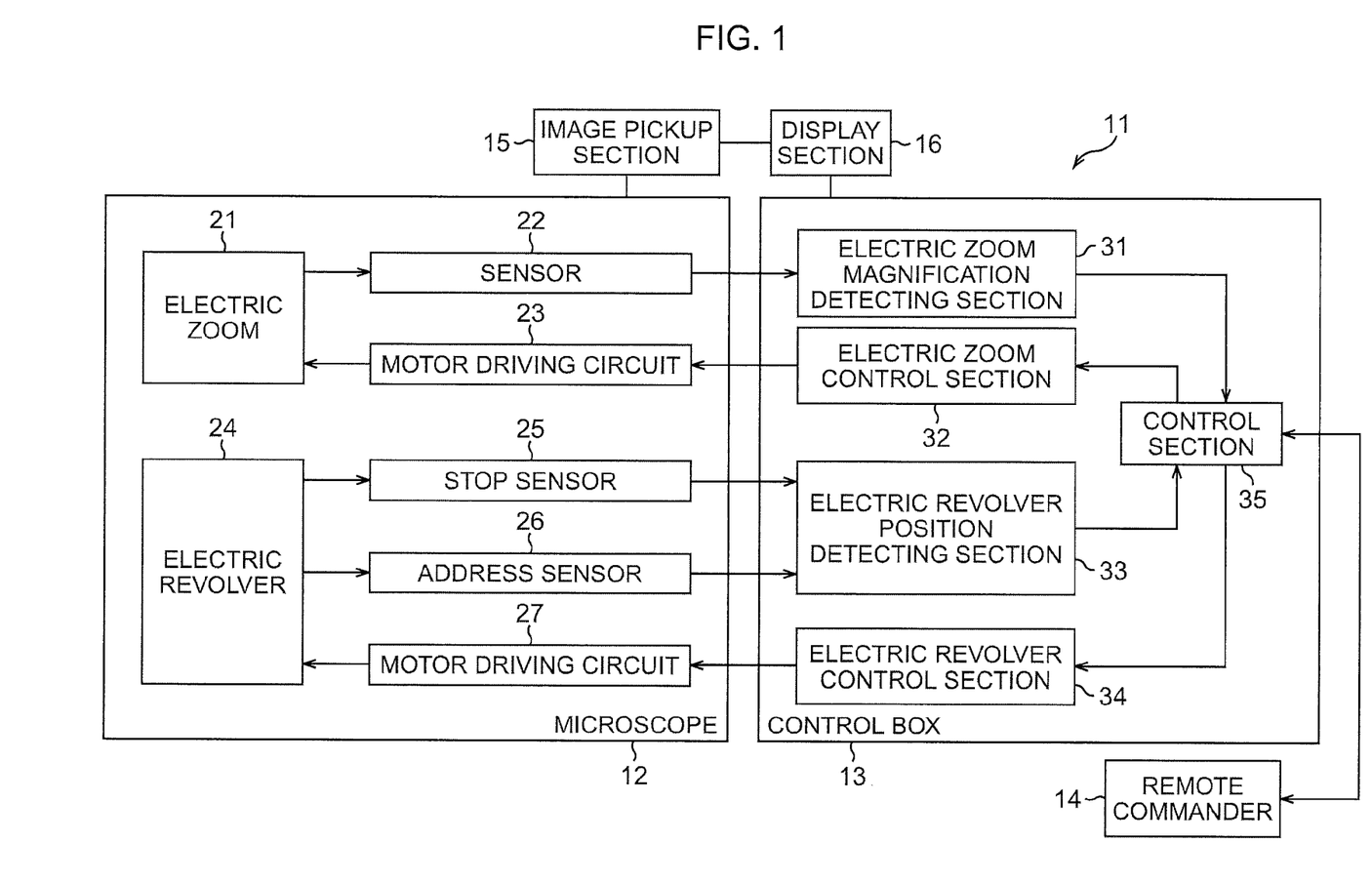
FIG. 1 is a block diagram illustrating an example of configuration of an embodiment of a microscope system to which the present invention is applied.

FIG. 1 is a block diagram illustrating an example of configuration of an embodiment of a microscope system to which the present invention is applied.

In FIG. 1, the microscope system 11 includes a microscope 12 configured to allow a user to observe a sample at a predetermined magnification, a control box 13 configured to control components of the microscope 12, a remote commander 14 configured to input the user's operations on the microscope 12 to the control box 13, an image pickup section 15 configured to pick up images of samples via the microscope 12, and a display section 16 configured to display images picked up by the image pickup section 15.

The microscope 12 includes an electric zoom 21, a sensor 22, a motor driving circuit 23, an electric revolver 24, a stop sensor 25, an address sensor 26, and a motor driving circuit 27.

The electric zoom 21 includes a plurality of zoom lenses and a motor configured to drive the zoom lenses (none of the zoom lenses and the motor are illustrated). The zoom lenses change in position when driven by the motor. This allows the magnification of the microscope 12 to change linearly.

The sensor 22 supplies a signal indicative of the position of each zoom lens to an electric zoom magnification detecting section 31 of the control box 13. For example, the sensor 22 is formed of a potentiometer or the like. The potentiometer offers a resistance value changed in response to movement of the zoom lenses of the electric zoom 21. The sensor 22 outputs such a signal as has a voltage changed depending on the resistance value, that is, a signal indicative of the position of each zoom lens.

The motor driving circuit 23 supplies the motor of the electric zoom 21 with power required to move the zoom lens of the electric zoom 21, in accordance with a control signal provided by an electric zoom control section 32 of the control box 13 as described below. In the electric zoom 21, the motor moves the zoom lenses in accordance with the power supplied by the motor driving circuit 23. The zoom lenses are then placed at positions corresponding to the magnification set in accordance with the control performed by the electric zoom control section 32.

The electric revolver 24 includes a revolver with a plurality of objective lenses (not shown in the drawings) with different magnifications installed therein, and a motor configured to drive the revolver in rotation. The revolver rotates when driven by the motor, to switch among objective lenses. Thus, the objective lens of the desired magnification is inserted into the observation optical path. Furthermore, the electric revolver 24 has addresses set therein which identify installation locations where the respective objective lenses are installed. The electric revolver 24 also includes a click stop mechanism configured to stop any of the objective lenses on an optical axis in the observation optical path. The click stop mechanism exerts a given force to hold the electric revolver 24 to stop the rotation thereof. Thus, the objective lens is positioned on the optical axis.

The stop sensor 25 detects whether or not the electric revolver 24 has stopped rotation with the objective lens placed on the optical axis, that is, whether or not the click stop mechanism has held the electric revolver 24 to stop the rotation thereof to place the objective lens on the optical axis. Then, the stop sensor 25 supplies a signal indicating whether or not the electric revolver 24 has stopped rotation, to an electric revolver position detecting section 33 of the control box 13.

The address sensor 26 includes, for example, a hall element to detect the address identifying the installation location where the objective lens placed on the optical axis is installed.

The motor driving circuit 27 supplies the motor of the electric revolver 24 with power required to rotate the revolver of the electric revolver 24, in accordance with a control signal provided by an electric revolver control section 34 of the control box 13 as described below. In the electric revolver 24, the motor rotates the revolver in accordance with the power supplied by the motor driving circuit 27. The objective lens is switched depending on the direction of the rotation.

The control box 13 includes the electric zoom magnification detecting section 31, the electric zoom control section 32, the electric revolver position detecting section 33, the electric revolver control section 34, and a control section 35.

The electric zoom magnification detecting section 31 is supplied with a signal from the sensor 22 which is indicative of the position of each zoom lens. The electric zoom magnification detecting section 31 then determines the magnification of the electric zoom 21 based on the position of each zoom lens. The electric zoom magnification detecting section 31 then supplies a signal indicative of the magnification of the electric zoom 21 to the control section 35. For example, the electric zoom magnification detecting section 31 is configured to pre-store a table in which the signal (voltage value) indicative of the position of each zoom lens is associated with the magnification of the electric zoom 21. The electric zoom magnification detecting section 31 references the table to determine the magnification of the electric zoom 21.

The electric zoom control section 32 is supplied with a signal from the control section 35 which specifies an increase or a decrease in the magnification of the electric zoom 21. In accordance with the signal, the electric zoom control section 32 supplies the motor driving circuit 23 with a control signal causing the zoom lenses of the electric zoom 21 to move.

Furthermore, the electric zoom control section 32 is supplied with a signal from the control section 35 which is indicative of the target magnification, as described below. Based on the signal, the electric zoom control section 32 determines the amount by which the electric zoom 21 moves the zoom lenses. The electric zoom control section 32 then supplies the motor driving circuit 23 with a control signal causing the zoom lenses to move by the amount. Thus, the motor driving circuit 23 supplies the motor of the electric zoom 21 with power corresponding to the control signal from the electric zoom control section 32. The motor driving circuit 23 thus causes the zoom lenses to be placed at the positions corresponding to the target magnification.

The electric revolver position detecting section 33 is supplied with a signal from the stop sensor 25 which indicates whether or not the electric revolver 24 has stopped rotation. The electric revolver position detecting section 33 reads the address from the electric revolver 24 detected by the address sensor 26 at a timing when the state indicated by the signal from the stop sensor 25 shifts from the one in which the electric revolver 24 has not stopped rotation to the one in which the electric revolver 24 has stopped rotation. That is, the electric revolver position detecting section 33 operates as follows when the electric revolver 24 is rotated to switch the objective lens in response to the user's operation. When the electric revolver 24 stops rotation and any of the objective lenses is placed on the optical axis, the electric revolver position detecting section 33 detects, via the address sensor 26, the address in the electric revolver 24 which identifies the installation location where the objective lens is installed. Then, the electric revolver position detecting section 33 supplies the control section 35 with a signal indicative of the address identifying the installation location of the objective lens placed on the optical axis.

The electric revolver control section 34 is supplied with a signal from the control section 35 which indicates a positive rotation or negative rotation of the revolver of the electric revolver 24. In accordance with the signal, the electric revolver control section 34 supplies the motor driving circuit 27 with a control signal causing the revolver of the electric revolver 24 to make positive rotation or negative rotation.

The control section 35 includes a CPU (Central Processing Unit), a ROM (Read Only Memory), and a RAM (Random Access Memory). The CPU loads a program stored in the ROM, into the RAM and executes the program to control the relevant sections of the control box 13.

As described above, the control section 35 is supplied with the signal from the electric zoom magnification detecting section 31 which is indicative of the magnification of the electric zoom 21 and the signal from the electric revolver position detecting section 33 which is indicative of the address identifying the installation location of the objective lens placed on the optical lens. Based on the signals, the control section 35 calculates the total magnification at which the sample is magnified by the microscope 12.

For example, the RAM of the control section 35 is configured to store the addresses of the installation locations and the magnifications of the objective lenses in association with one another. The control section 35 multiplies the magnification of the electric zoom 21 by the magnification of the objective lens associated with the address indicated by the signal from the electric revolver position detecting section 33 to determine the total magnification.

Furthermore, the control section 35 is supplied with an operation signal from the remote commander 14 which corresponds to an operation performed on the remote commander 14 by the user. In accordance with the operation signal, the control section 35 supplies the electric zoom control section 32 with a signal specifying an increase or a decrease in the magnification of the electric zoom 21. Additionally, in accordance with the operation signal from the remote commander 14, the control section 35 supplies the electric revolver control section 34 with a signal specifying positive rotation or negative rotation of the revolver of the electric revolver 24.

Here, the remote commander 14 will be described with reference to FIG. 2.

Figure 2:
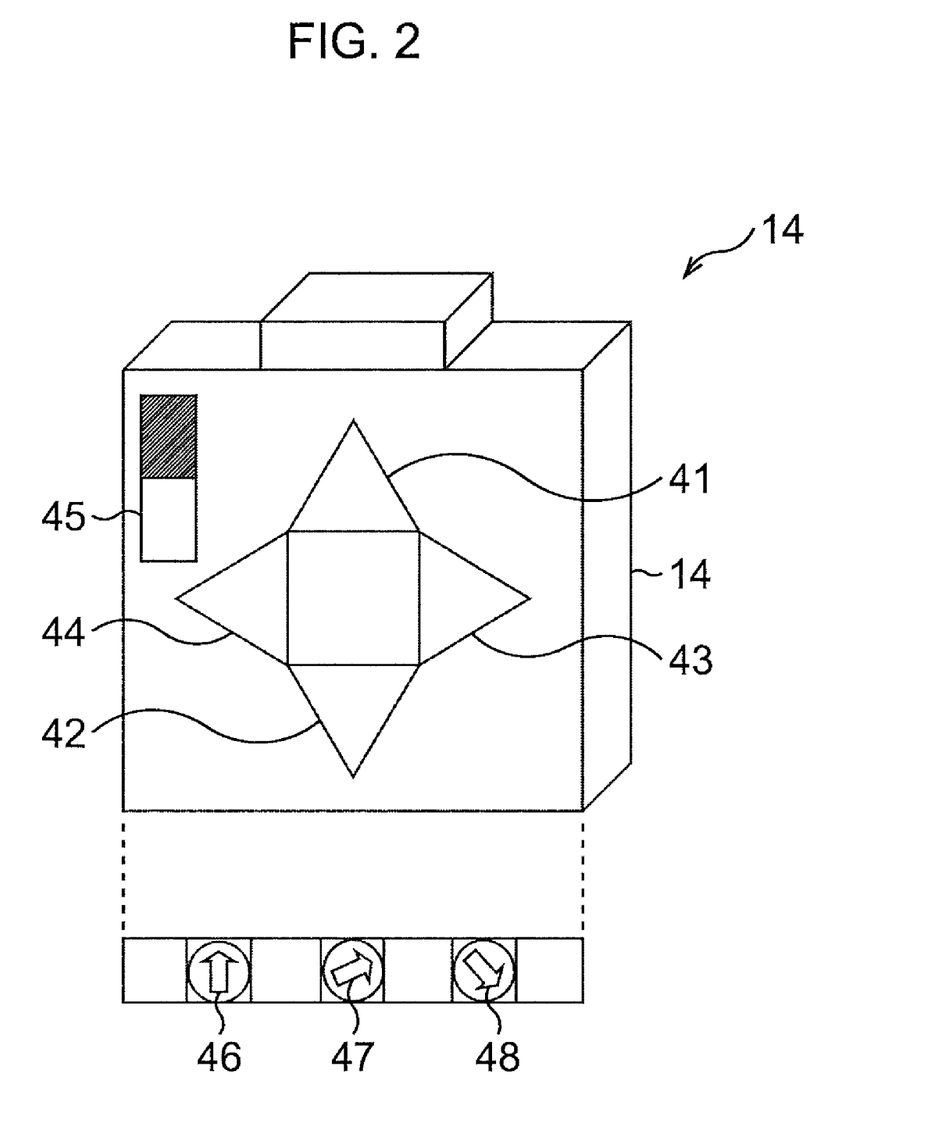
FIG. 2 is a diagram showing a remote commander 14.

FIG. 2 is a perspective view of the remote commander 14. A bottom view of the remote commander 14 is shown below the perspective view.

As shown in FIG. 2, the remote commander 14 includes a zoom up switch 41, a zoom down switch 42, a positive rotation switch 43, a negative rotation switch 44, and a function selector switch 45 all provided on a front surface thereof. The remote commander 14 further includes magnification setting switches 46 to 48 provided on a bottom surface thereof.

The zoom up switch 41 or the zoom down switch 42 is operated to change the magnification of the electric zoom 21.

For example, when the user performs an operation of depressing the zoom up switch 41, the remote commander 14 supplies the control section 35 with an operation signal indicating that the zoom up switch 41 has been operated. The control section 35 then supplies the electric zoom control section 32 with a signal specifying an increase in the magnification of the electric zoom 21. This causes the zoom lenses of the electric zoom 21 to move in a direction in which the magnification increases, thus increasing the total magnification of the microscope 12.

Likewise, when the user performs an operation of depressing the zoom down switch 42, the remote commander 14 supplies the control section 35 with an operation signal indicating that the zoom down switch 42 has been operated. The control section 35 then supplies the electric zoom control section 32 with a signal specifying a decrease in the magnification of the electric zoom 21. This causes the zoom lenses of the electric zoom 21 to move in a direction in which the magnification decreases, thus reducing the total magnification of the microscope 12.

The positive rotation switch 43 or the negative rotation switch 44 is operated to switch among the objective lenses of the electric revolver 24.

For example, when the user performs an operation of depressing the positive rotation switch 43, the remote commander 14 supplies the control section 35 with an operation signal indicating that the positive rotation switch 43 has been operated. The control section 35 supplies the electric revolver control section 34 with a signal specifying rotation of the revolver of the electric revolver 24 in the positive direction. Thus, the revolver of the electric revolver 24 rotates in the positive direction to switch the objective lens.

Likewise, when the user performs an operation of depressing the negative rotation switch 44, the remote commander 14 supplies the control section 35 with an operation signal indicating that the negative rotation switch 44 has been operated. The control section 35 supplies the electric revolver control section 34 with a signal specifying rotation of the revolver of the electric revolver 24 in the negative direction. Thus, the revolver of the electric revolver 24 rotates in the negative direction to switch the objective lens.

The function selector switch 45 is operated in a switchable manner to enable or disable a function to maintain the total magnification of the microscope 12. For example, the user operates the function selector switch 45 to enable the function to maintain the total magnification of the microscope 12, the process of maintaining the total magnification of the microscope 12 is carried out as described below with reference to FIGS. 4 to 8.

The magnification setting switches 46 to 48 are operated to set the magnification of the objective lens installed in the electric revolver 24.

For example, three objective lenses can be installed in the electric revolver 24. The magnification setting switch 46 is used to set the magnification of the objective lens installed at the installation location identified by an address 1. Furthermore, the magnification setting switch 47 is used to set the magnification of the objective lens installed at the installation location identified by an address 2. The magnification setting switch 48 is used to set the magnification of the objective lens installed at the installation location identified by an address 3.

For example, the magnification setting switches 46 to 48 are formed of rotary switches. The user sets the positions of the magnification setting switches 46 to 48 in accordance with the magnifications of the objective lenses installed at the installation locations identified by the addresses 1 to 3 in the electric revolver 24. For example, when the control box 13 is started, the control section 35 reads the positions of the magnification setting switches 46 to 48 and stores the addresses corresponding to the magnification setting switches 46 to 48 and the magnifications corresponding to the read positions in association with one another.

As described above, in the control section 35, the addresses of the installation locations and the magnifications of the objective lenses are stored in association with one another. For example, when the signal supplied by the electric revolver position detecting section 33 indicates the address 1, the control section 35 calculates the total magnification of the microscope 12 by multiplying the magnification of the objective lens stored in association with the address 1 by the magnification of the electric zoom 21.

Thereafter, for example, when the user operates the positive rotation switch 43 or negative rotation switch 44 on the remote commander 14 to rotate the electric revolver 24 to place the objective lens installed at the installation location indicated by the address 2, on the optical axis in the observation optical path, the electric revolver position detecting section 33 supplies a signal indicative of the address 2 to the control section 35. At this time, based on the total magnification obtained before the switching of the objective lens and the magnification of the switched objective lens, the control section 35 calculates the target magnification of the electric zoom 21 to be the magnification of the electric zoom 21 required to keep the total magnification obtained after the switching equal to (almost the same as) that obtained before the switching.

When the control section 35 supplies a signal indicative of the target magnification of the electric zoom 21 to the electric zoom control section 32, the electric zoom control section 32 determines the amount by which the zoom lens of the electric zoom 21 is to move, based on the signal. The electric zoom control section 32 then supplies the motor driving circuit 23 with a control signal causing the zoom lens to move by the amount of movement. Thus, the magnification of the electric zoom 21 is changed to the target magnification, allowing the total magnification obtained after the switching of the objective lens to be kept equal to that obtained before the switching of the objective lens.

Moreover, when the user operates the zoom up switch 41 or zoom down switch 42 on the remote commander 14 to linearly change the magnification of the electric zoom 21, and the magnification of the electric zoom 21 reaches an upper limit value or a lower limit value, then the microscope system 11 performs the following operation. The revolver of the electric revolver 24 automatically rotates to switch the objective lens. Furthermore, processing is carried out to keep the total magnification of the microscope 12 obtained after the switching of the objective lens equal to that obtained before the switching.

For example, it is assumed that the user operates the zoom up switch 41 on the remote commander 14 to linearly increase the magnification of the electric zoom 21 and that the magnification of the electric zoom 21 reaches the upper limit value. At this time, if the total magnification of the microscope 12 can further be increased by rotating the electric revolver 24, the control section 35 causes the electric revolver control section 34 and the motor driving circuit 27 to rotate the revolver of the electric revolver 24 such that one of the objective lenses which has a higher magnification is inserted into the observation optical path. Then, based on the total magnification obtained before the switching of the objective lens and the magnification of the switched objective lens, the control section 35 calculates the target magnification of the electric zoom 21 required to keep the total magnification obtained after the switching equal to that obtained before the switching. The control section 35 then causes the electric zoom control section 32 and the motor driving circuit 23 to change the magnification of the electric zoom 21 so as to keep the total magnification obtained after the switching of the objective lens equal to that obtained before the switching of the objective lens.

Likewise, it is assumed that the user operates the zoom down switch 42 on the remote commander 14 to linearly reduce the magnification of the electric zoom 21 and that the magnification of the electric zoom 21 reaches the lower limit value. At this time, if the total magnification of the microscope 12 can further be reduced by rotating the electric revolver 24, the control section 35 causes the electric revolver control section 34 and the motor driving circuit 27 to rotate the revolver of the electric revolver 24 such that one of the objective lenses which has a lower magnification is inserted into the observation optical path. The control section 35 then causes the magnification of the electric zoom 21 to be changed so as to keep the total magnification obtained after the switching of the objective lens equal to that obtained before the switching of the objective lens.

Here, as described above, the magnifications of the plurality of objective lenses interposed in the electric revolver 24 are stored in the control section 35. Based on whether or not any of the objective lenses installed in the electric revolver 24 has a magnification higher or lower than that of the objected lens currently interposed in the observation optical path, the control section 35 determines whether or not the total magnification of the microscope 12 can be increased or reduced by switching the objective lens.

Furthermore, the positional relationship among the installation locations in the electric revolver 24 is stored in the control section 35. Thus, if the total magnification of the microscope 12 can be increased or reduced by switching the objective lens, the control section 35 supplies the electric revolver control section 34 with a signal specifying positive rotation and negative rotation of the revolver of the electric revolver 24 in accordance with the direction in which the desired objective lens is installed.

Now, the process of maintaining the total magnification of the microscope 12 will be described with reference to FIG. 3.

Figure 3:
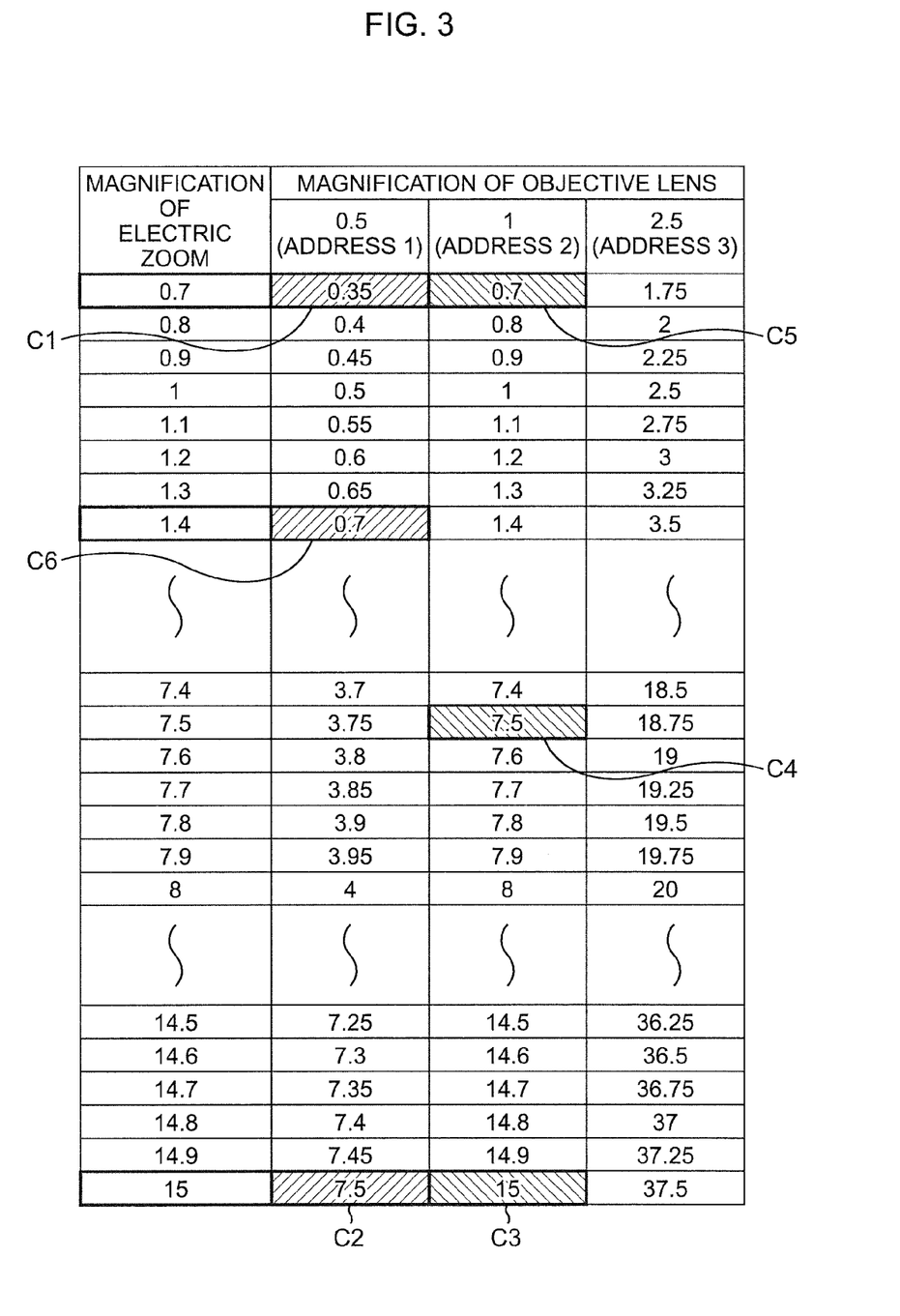
FIG. 3 is a diagram illustrating a process of causing the total magnification of a microscope 12 to be maintained.

FIG. 3 illustrates the relationship between the total magnification of the microscope 12 and both the magnifications of the electric zoom 21 and the objective lens. As illustrated in FIG. 3, the electric zoom 21 allows the magnification thereof to change linearly between 0.7× and 15× in increments of 0.1×. Three objective lenses are installed in the electric revolver 24. One of the objective lenses which has a magnification of 0.5× is installed at the address 1. Another objective lens of 1× magnification is installed at the address 2. The remaining objective lens, which has a magnification of 2.5×, is installed at the address 3.

The control section 35 calculates Expression (1) to determine and store the current total magnification of the microscope 12.

$$\text{Total magnification} = \text{magnification of the electric zoom} \times \text{magnification of the objective lens} \quad (1)$$

For example, it is assumed that the electric zoom 21 has a 0.7× magnification and that a 0.5× objective lens (address 1) is placed on the optical axis. Then, the control section 35 calculates the current total magnification of the microscope 12 to be 0.3× and stores this value. That is, as illustrated in FIG. 3, the current total magnification is 0.35× illustrated in a grid C1 corresponding to the case where the electric zoom 21 has a 0.7× magnification, whereas the objective lens has a 0.5× magnification.

At this time, when the user operates the zoom up switch 41, since the magnification of the electric zoom 21 is not equal to the lower limit value, the control section 35 causes the electric zoom control section 32 and the motor driving circuit 23 to increase the magnification of the electric zoom 21 by one level. Thus, the magnification of the electric zoom 21 is set to 0.8×. The total magnification of the microscope 12 is set to 0.4×. The process of increasing the magnification of the electric zoom 21 on a step-by-step basis as described above is repeated. Then, when the magnification of the electric zoom 21 reaches the upper limit value, that is, 15×, the total magnification of the microscope 12 is set to 7.5× as illustrated in a grid C2.

Then, when the user further operates the zoom up switch 41, since the magnification of the electric zoom 21 is equal to the upper limit value, the control section 35 performs control such that the objective lens placed on the optical axis is switched from the 0.5× objective lens (address 1) to the 1× objective lens (address 2) in order to increase the total magnification of the microscope 12. At this time, when the objective lens is simply switched as described above, the total magnification obtained after the switching is set to 15×, shown in a grid C3 corresponding to the case where the electric zoom 21 has a 15× magnification, whereas the objective lens has a 1× magnification, as illustrated in FIG. 3.

Thus, in order to keep the total magnification at the value obtained before the switching to the 1× objective lens (address 2), that is, at 7.5×, the control section 35 causes the magnification of the electric zoom 21 to be changed to 7.5×. Thus, the total magnification obtained after the switching is set to 7.5×, shown in a grid C4 corresponding to the case where the electric zoom 21 has a 7.5× magnification, whereas the objective lens has a 1× magnification, as illustrated in FIG. 3.

On the other hand, when the microscope 12 has a 7.5× total magnification (this corresponds to the grid C4) and the user operates the zoom down switch 42, since the magnification of the electric zoom 21 is not equal to the lower limit value, the control section 35 causes the electric zoom control section 32 and the motor driving circuit 23 to reduce the magnification of the electric zoom 21 by one level. Thus, the magnification of the electric zoom 21 is set to 7.4×. The total magnification of the microscope 12 is set to 7.4×. The process of reducing the magnification of the electric zoom 21 on a step-by-step basis as described above is repeated. Then, when the magnification of the electric zoom 21 reaches the lower limit value, that is, 0.7×, the total magnification of the microscope 12 is set to 0.7× as illustrated in a grid C5.

Then, when the user further operates the zoom down switch 42, since the magnification of the electric zoom 21 is equal to the lower limit value, the control section 35 controllably switches the objective lens placed on the optical axis from the 1× objective lens (address 2) to the 0.5× objective lens (address 1) in order to reduce the total magnification of the microscope 12. At this time, when the objective lens is simply switched as described above, the total magnification obtained after the switching is set to 0.35×, shown in the grid C1 corresponding to the case where the electric zoom 21 has a 0.7× magnification, whereas the objective lens has a 0.5× magnification, as illustrated in FIG. 3.

Thus, in order to keep the total magnification at the value obtained before the switching to the 0.5× objective lens (address 1), that is, at 0.7×, the control section 35 causes the magnification of the electric zoom 21 to be changed to 1.4×. Thus, the total magnification obtained after the switching is set to 0.7×, shown in the grid C6 corresponding to the case where the electric zoom 21 has a 1.4× magnification, whereas the objective lens has a 0.5× magnification, as illustrated in FIG. 3.

As described above, the microscope system 11 performs the operation of changing the magnification of the electric zoom 21. When the magnification of the electric zoom 21 falls outside the magnification changeable range (in the example illustrated in FIG. 3, the range from 0.7× to 15×), the electric revolver 24 switches the objective lens. Furthermore, the microscope system 11 carries out the process of keeping the total magnification of the microscope 12 obtained after the switching of the objective lens equal to that obtained before the switching.

Additionally, when the user operates the positive rotation switch 43 or negative rotation switch 44 on the remote commander 14 to switch the objective lens placed on the optical axis, the microscope system 11 carries out the process of changing the magnification of the electric zoom 21 so as to maintain the total magnification of the microscope 12.

For example, when the electric zoom 21 has a 15× magnification and the 0.5× objective lens (address 1) is placed on the optical axis, the control section 35 calculates the current total magnification of the microscope 12 to be 7.5× (this corresponds to the grid C2) and stores this value. Then, when the user operates the positive rotation switch 43 on the remote commander 14 so as to place the 1× objective lens (address 2) on the optical axis, the control section 35 causes the electric revolver control section 34 and the motor driving circuit 27 to rotate the revolver of the electric revolver 24 in the positive direction so as to place the 1× objective lens on the optical axis. At this time, in order to keep the total magnification at the value obtained before switching to the 1× objective lens, that is, at 7.5×, the control section 35 changes the magnification of the electric zoom 21 to 7.5× to change the total magnification of the microscope 12 to 7.5× (this corresponds to the grid C4). Thus, the total magnification of the microscope 12 obtained after the switching of the objective lens is kept equal to that obtained before the switching.

Furthermore, when the electric zoom 21 has a 0.7× magnification and the 1× objective lens (address 2) is placed on the optical axis, the control section 35 calculates the current total magnification of the microscope 12 to be 0.7× (this corresponds to the grid C5) and stores this value. Then, when the user operates the negative rotation switch 44 on the remote commander 14 so as to place the 0.5× objective lens (address 1) on the optical axis, the control section 35 causes the electric revolver control section 34 and the motor driving circuit 27 to rotate the revolver of the electric revolver 24 in the negative direction so as to place the 0.5× objective lens on the optical axis. At this time, in order to keep the total magnification at the value obtained before switching to the 0.5× objective lens, that is, at 0.7×, the control section 35 changes the magnification of the electric zoom 21 to 1.4× to change the total magnification of the microscope 12 to 0.7× (this corresponds to a grid C6). Thus, the total magnification of the microscope 12 obtained after the switching of the objective lens is kept equal to that obtained before the switching.

Figure 4:
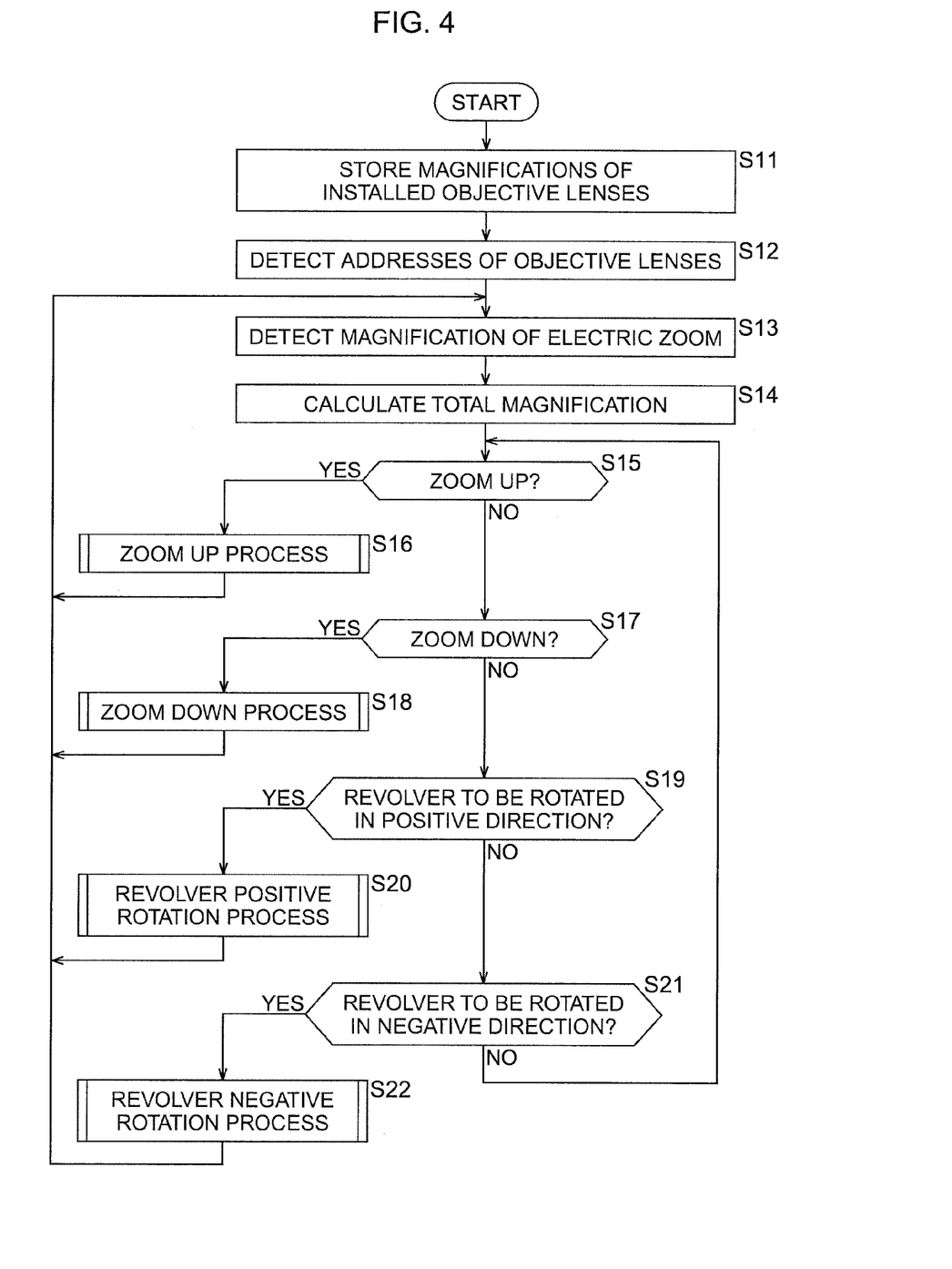
FIG. 4 is a flow chart illustrating the process of causing the total magnification of the microscope 12 to be maintained.

FIG. 4 is a flowchart illustrating a process in which the microscope system 11 causes the total magnification of the microscope 12 to be maintained.

For example, when the microscope system 11 is powered on to start the control box 13, the processing is started. In step S11, the control section 35 reads the magnification of the objective lens installed in the electric revolver 24 set by the magnification setting switches 46 to 48 on the remote commander 14. Then, the control section 35 stores the addresses corresponding to the magnification setting switches 46 to 48 and the magnifications read from the magnification setting switches 46 to 48 in association with one another. The processing proceeds to step S12.

In step S12, the electric revolver position detecting section 33 causes the address sensor 26 to detect the address identifying the installation location where the objective lens placed on the optical axis is installed. The electric revolver position detecting section 33 supplies a signal indicative of the address to the control section 35.

After step S12, the processing proceeds to step S13. The electric zoom magnification detecting section 31 causes the sensor 22 to detect the magnification of the electric zoom 21. The electric zoom magnification detecting section 31 supplies the control section 35 with a signal indicative of the magnification of the electric zoom 21. The processing proceeds to step S14.

In step S14, based on the magnification of the objective lens stored in association with the address indicated by the signal supplied by the electric revolver position detecting section 33 in step S12 and the magnification of the electric zoom 21 indicated by the signal supplied by the electric zoom magnification detecting section 31 in step S13, the control section 35 calculates Expression (1) described above to calculate the total magnification of the microscope 12.

After step S14, the processing proceeds to step S15. The control section 35 determines whether or not the user has performed an operation of increasing the magnification of the electric zoom 21 (zoom up operation), that is, whether or not the control section 35 has been supplied with an operation signal from the remote commander 14 which indicates that the zoom up switch 41 has been operated.

In step S15, if the control section 35 determines that the user has performed the operation of increasing the magnification of the electric zoom 21, the processing proceeds to step S16 to carry out a zoom up process. After the zoom up process, the processing returns to step S13. Thereafter, similar processing is repeated.

On the other hand, in step S15, if the control section 35 determines that the user has not performed the operation of increasing the magnification of the electric zoom 21, the processing proceeds to step S17.

In step S17, the control section 35 determines whether or not the user has performed an operation of reducing the magnification of the electric zoom 21 (zoom down operation), that is, whether or not the control section 35 has been supplied with an operation signal from the remote commander 14 which indicates that the zoom down switch 42 has been operated, In step S17, if the control section 35 determines that the user has performed the operation of reducing the magnification of the electric zoom 21, the processing proceeds to step S18 to carry out a zoom down process. After the zoom down process, the processing returns to step S13. Thereafter, similar processing is repeated.

On the other hand, in step S17, if the control section 35 determines that the user has not performed the operation of reducing the magnification of the electric zoom 21, the processing proceeds to step S19.

In step S19, the control section 35 determines whether or not the user has performed an operation of rotating the revolver of the electric revolver 24 in the positive direction, that is, whether or not the control section 35 has been supplied with an operation signal from the remote commander 14 which indicates that the positive rotation switch 43 has been operated.

In step S19, if the control section 35 determines that the user has performed the operation of rotating the revolver in the positive direction, the processing proceeds to step S20 to carry out a revolver positive rotation process. After the revolver positive rotation process, the processing returns to step S13. Thereafter, similar processing is carried out.

On the other hand, in step S19, if the control section 35 determines that the user has not performed the operation of rotating the revolver in the positive direction, the processing proceeds to step S21.

In step S21, the control section 35 determines whether or not the user has performed an operation of rotating the revolver of the electric revolver 24 in the negative direction, that is, whether or not the control section 35 has been supplied with an operation signal from the remote commander 14 which indicates that the negative rotation switch 44 has been operated.

In step S21, if the control section 35 determines that the user has performed the operation of rotating the revolver in the negative direction, the processing proceeds to step S22 to carry out a revolver negative rotation process. After the revolver negative rotation process, the processing returns to step S13. Thereafter, similar processing is carried out.

After the zoom up process carried out in step S16, after the zoom down process carried out in step S18, after the revolver positive rotation process carried out in step S20, or after the revolver negative rotation process carried out in step S22, the processing returns to step S13 to perform the following operation. The magnification of the electric zoom 21 changed in each of the processes is detected by the electric zoom magnification detecting section 31. Then, the total magnification of the microscope 12 is determined using the changed magnification of the electric zoom 21.

On the other hand, in step S21, if the control section 35 determines that the user has not performed the operation of rotating the revolver in the negative direction, the processing returns to step S15. Thereafter, similar processing is repeated. That is, in this case, the user has not performed the operation. Thus, the processing stands by until the user performs the operation.

Figure 5:
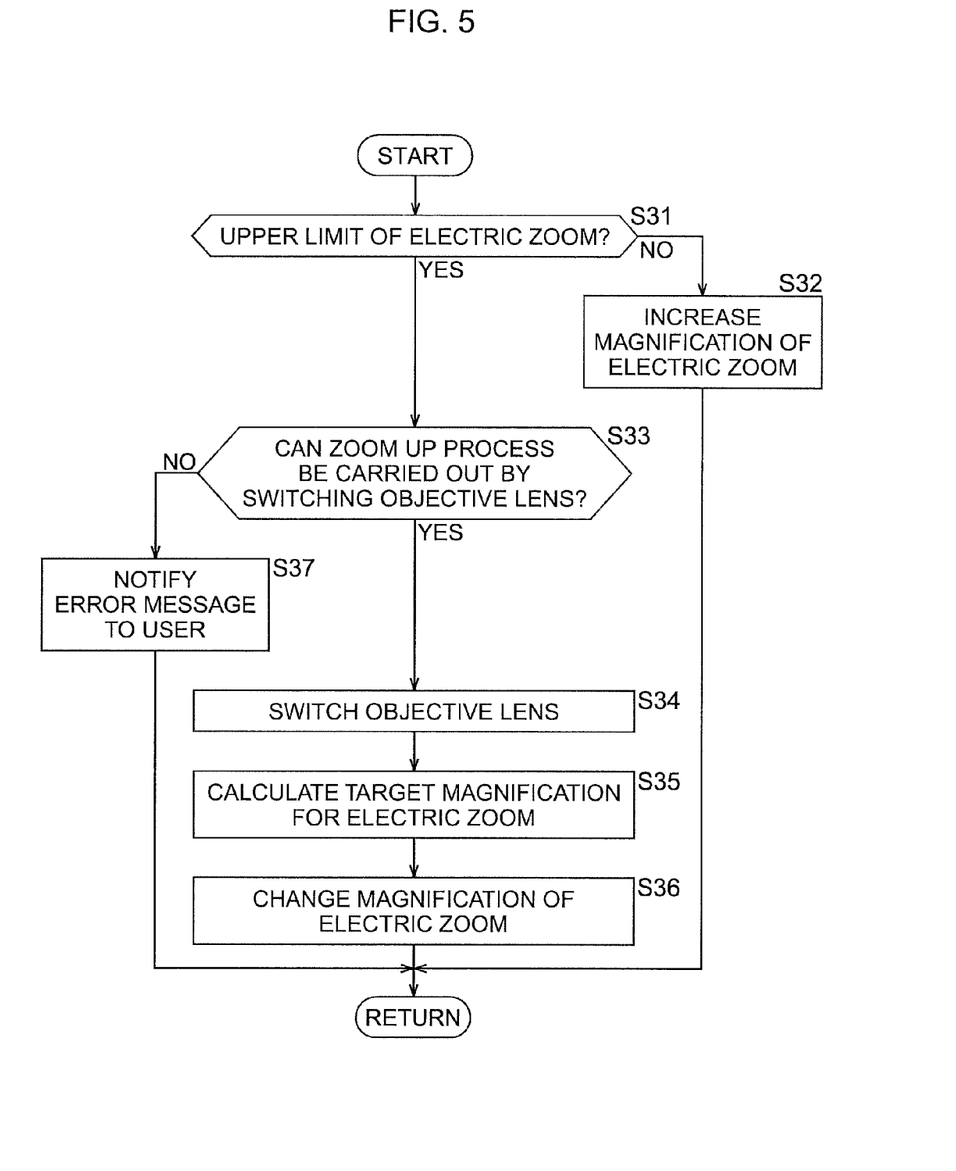
FIG. 5 is a flowchart illustrating a zoom up process.

FIG. 5 is a flowchart illustrating the zoom up process in step S16 in FIG. 4.

In step S31, the control section 35 determines whether or not the current magnification of the electric zoom 21 is equal to the upper limit value of the zoom range, that is, whether or not the magnification detected via the sensor 22 and the electric zoom magnification detecting section 31 in the preceding step S13 (FIG. 4) is equal to the upper limit value of the zoom range.

In step S31, the control section 35 determines that the current magnification of the electric zoom 21 is not equal to the upper limit value of the zoom range, the processing proceeds to step S32. The control section 35 causes the electric zoom control section 32 and the motor driving circuit 23 to increase the magnification of the electric zoom 21. Thus, the zoom up process ends, and the processing returns to step S13.

On the other hand, in step S31, if the control section 35 determines that the current magnification of the electric zoom 21 is equal to the upper limit value of the zoom range, the processing proceeds to step S33. The control section 35 determines whether or not the total magnification of the microscope 12 can be increased by switching the objective lens.

For example, the control section 35 references the magnification of the objective lens read in step S11 in FIG. 4. The control section 35 thus determines the total magnification of the microscope 12 can be increased by switching the objective lens when the electric revolver 24 includes an object lens installed therein and having a higher magnification than the objective lens currently interposed in the observation optical path. On the other hand, the control section 35 determines the total magnification of the microscope 12 cannot be increased by switching the objective lens when the electric revolver 24 includes no object lens installed therein and having a higher magnification than the objective lens currently interposed in the observation optical path.

In step S33, if the control section 35 determines that the total magnification of the microscope 12 can be increased by switching the objective lens, the processing proceeds to step S34.

In step S34, the control section 35 switches the objective lens by causing the motor driving circuit 27 and the electric revolver control section 34 to rotate the revolver of the electric revolver 24 such that one of the objective lenses which has a magnification one level higher than that of the objective lens currently interposed in the observation optical path is inserted into the observation optical path.

After step S34, the processing proceeds to step S35. Based on the magnification of the objective lens switched in step S34 and the total magnification of the microscope 12 obtained before the switching of the objective lens (that is, the total magnification of the microscope 12 calculated in the preceding step S14), the control section 35 calculates the target magnification of the electric zoom 21. That is, the control section 35 determines the target magnification of the electric zoom 21 such that the magnification of the switched objective lens serves to maintain the total magnification of the microscope 12 obtained before the switching of the objective lens is as described above with reference to FIG. 3.

After step S35, the processing proceeds to step S36. The control section 35 supplies the electric zoom control section 32 with a signal indicative of the target magnification of the electric zoom 21 which is calculated in step S35. Based on the signal, the electric zoom control section 32 causes the motor driving circuit 23 to control the electric zoom 21. In the electric zoom 21, the motor drives the zoom lens under the control of the electric zoom control section 32 to set the magnification of the electric zoom 21 to the target magnification.

After step S36, the zoom up process ends. The processing returns to step S13 in FIG. 4.

On the other hand, in step S33, if the control section 35 determines that the total magnification of the microscope 12 cannot be increased by switching the objective lens, the processing proceeds to step S37.

In step S37, the control section 35, for example, causes the display section 16 to display an error message indicating that the zoom up process cannot be carried out or causes a speaker (not shown in the drawings) to output an error message or an error sound to notify the user that the zoom up process cannot be carried out. For example, in the example illustrated in FIG. 3, if the electric zoom 21 has a magnification of 15× and the 2.5× objective lens is interposed in the observation optical path, the total magnification of the microscope 12 cannot be increased. Thus, the control section 35 executes the process of notifying the user that the zoom up process cannot be carried out.

After step S37, the zoom up process ends. The processing returns to step S13 in FIG. 4.

Figure 6:
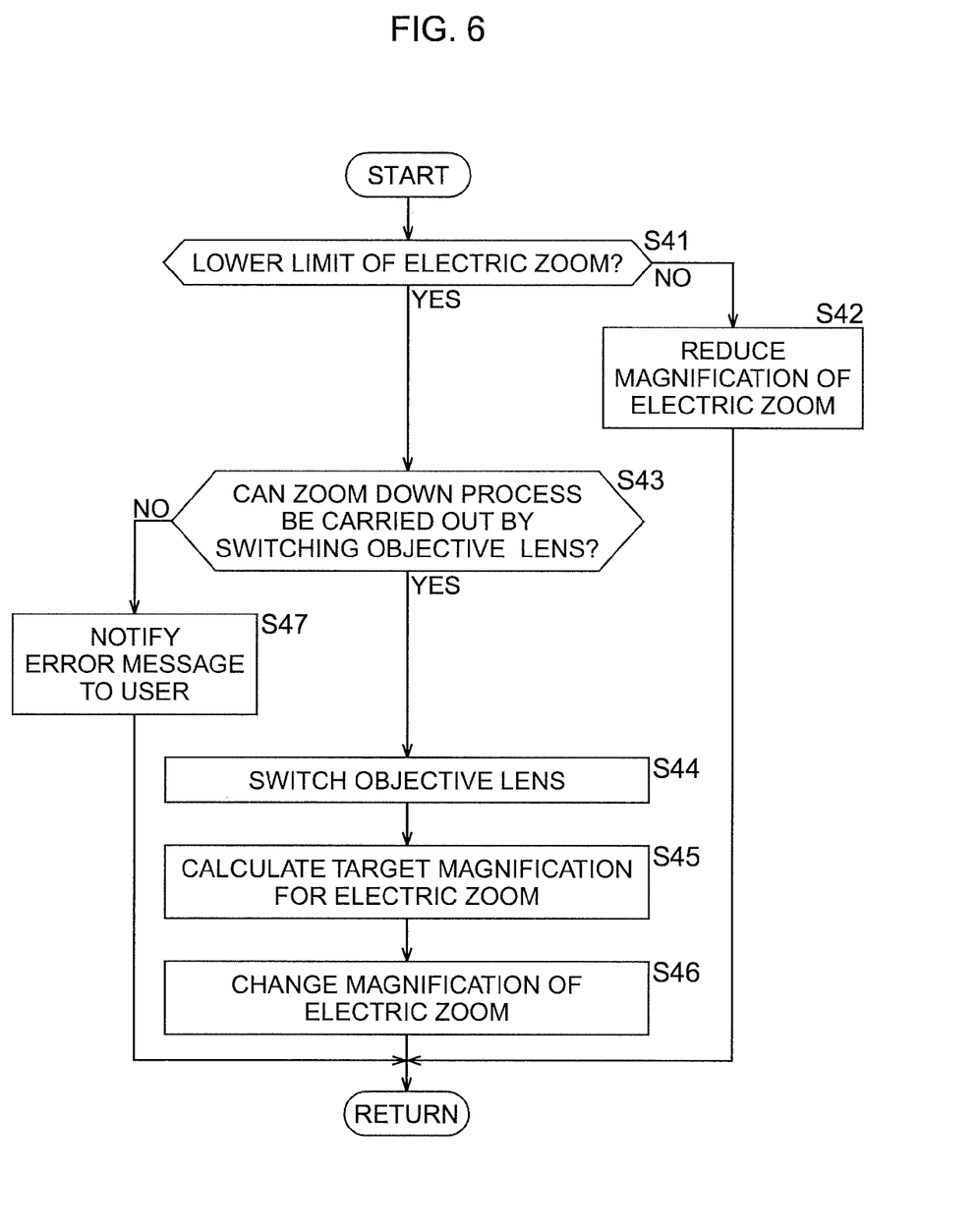
FIG. 6 is a flowchart illustrating a zoom down process.

FIG. 6 is a flowchart illustrating a zoom down process carried out in step S18 in FIG. 4.

In step S41, the control section 35 determines whether or not the current magnification of the electric zoom 21 corresponds to the lower limit value of the zoom range, that is, whether or not the magnification detected via the sensor 22 and the electric zoom magnification detecting section 31 in the preceding step S13 (FIG. 4) corresponds to the lower limit value of the zoom range.

In step S41, the control section 35 determines that the current magnification of the electric zoom 21 does not correspond to the lower limit value of the zoom range, the processing proceeds to step S42. The control section 35 causes the electric zoom control section 32 and the motor driving circuit 23 to reduce the magnification of the electric zoom 21. Thus, the zoom down process ends, and the processing returns to step S13.

On the other hand, in step S41, if the control section 35 determines that the current magnification of the electric zoom 21 corresponds to the lower limit value of the zoom range, the processing proceeds to step S43. The control section 35 determines whether or not the total magnification of the microscope 12 can be reduced by switching the objective lens.

For example, the control section 35 references the magnification of the objective lens read in step S11 in FIG. 4. The control section 35 thus determines the total magnification of the microscope 12 can be reduced by switching the objective lens when the electric revolver 24 includes an object lens installed therein and having a lower magnification than the objective lens currently interposed in the observation optical path. On the other hand, the control section 35 determines the total magnification of the microscope 12 cannot be reduced by switching the objective lens when the electric revolver 24 includes no object lens installed therein and having a lower magnification than the objective lens currently interposed in the observation optical path.

In step S43, if the control section 35 determines that the total magnification of the microscope 12 can be reduced by switching the objective lens, the processing proceeds to step S44.

In step S44, the control section 35 switches the objective lens by causing the motor driving circuit 27 and the electric revolver control section 34 to rotate the revolver of the electric revolver 24 such that one of the objective lenses which has a magnification one level lower than that of the objective lens currently interposed in the observation optical path is inserted into the observation optical path.

After step S44, the processing proceeds to steps S45 and S46. As is the case with the processing in steps S35 and S36 in FIG. 5, the control section 35 calculates the target magnification of the electric zoom 21 required to maintain the total magnification of the microscope 12. The control section 35 then causes the electric zoom control section 32 and the motor driving circuit 23 to set the magnification of the electric zoom 21 to the target magnification.

After step S46, the zoom down process ends. The processing returns to step S13 in FIG. 4.

On the other hand, in step S43, if the control section 35 determines that the total magnification of the microscope 12 cannot be increased by switching the objective lens, the processing proceeds to step S47. The control section 35 then executes a process of notifying the user that the zoom down cannot be carried out, as is the case with the processing in step S37 in FIG. 5. For example, in the example illustrated in FIG. 3, if the electric zoom 21 has a magnification of 0.7× and the 0.5× magnification objective lens is interposed in the observation optical path, the total magnification of the microscope 12 cannot be reduced. Thus, the control section 35 executes the process of notifying the user that the zoom down cannot be carried out.

After step S47, the zoom down process ends. The processing returns to step S13 in FIG. 4.

Figure 7:
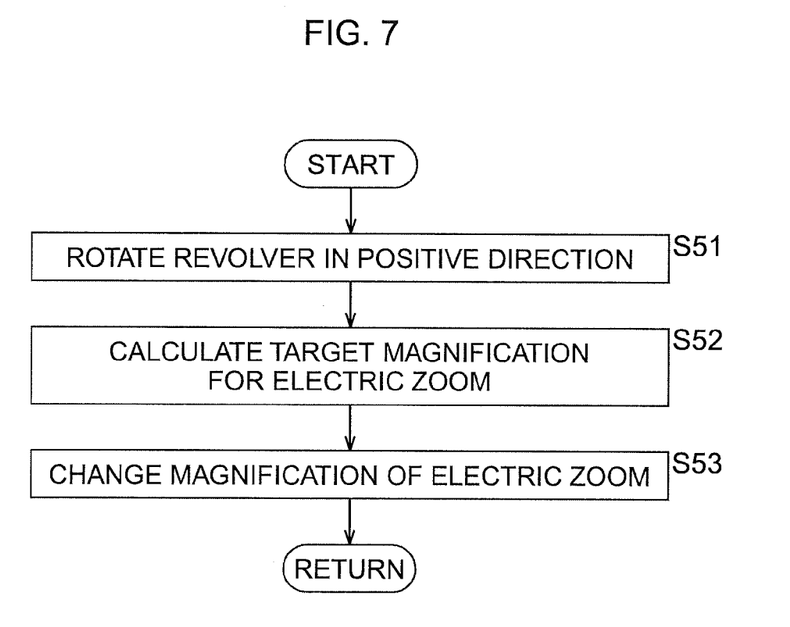
FIG. 7 is a flowchart illustrating a revolver positive rotation process.

FIG. 7 is a flowchart illustrating a revolver positive rotation process in step S20 in FIG. 4.

In step S51, the control section 35 causes the motor driving circuit 27 and the electric revolver control section 34 to rotate the revolver of the electric revolver 24 in the positive direction. Then, the processing proceeds to step S52.

In step S52, the control section 35 causes the address sensor 26 and the electric revolver position detecting section 33 to detect the magnification of the objective lens switched in step S51. Then, based on the magnification of the objective lens and the total magnification of the microscope 12 obtained before the switching of the objective lens (that is, the total magnification of the microscope 12 calculated in the preceding step S14), the control section 35 calculates the target magnification of the electric zoom 21. That is, as described with reference to FIG. 3, the control section 35 determines the target magnification of the electric zoom 21 such that the magnification of the switched objective lens serves to maintain the total magnification of the microscope 12 obtained before the switching of the objective lens.

After step S52, the processing proceeds to step S53. The control section 35 supplies the electric zoom control section 32 with a signal indicative of the target magnification of the electric zoom 21 calculated in step S52. Based on the signal, the electric zoom control section 32 causes the motor driving circuit 23 to control the electric zoom 21. In the electric zoom 21, the motor drives the zoom lens under the control of the electric zoom control section 32 to set the magnification of the electric zoom 21 to the target magnification.

After step S53, the revolver positive rotation process ends. The processing returns to step S13 in FIG. 4.

Figure 8:
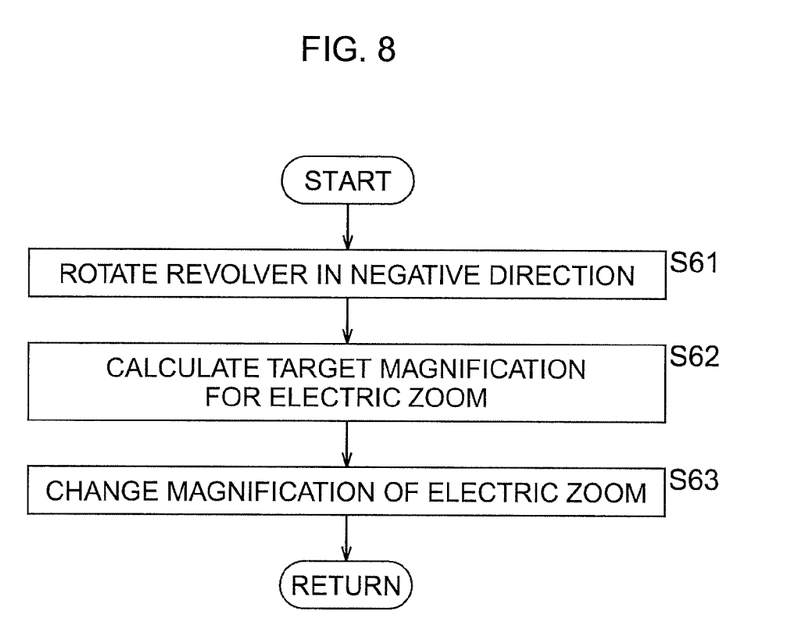
FIG. 8 is a flowchart illustrating a revolver negative rotation process.

FIG. 8 is a flowchart illustrating a revolver negative rotation process in step S22 in FIG. 4.

In step S61, the control section 35 causes the motor driving circuit 27 and the electric revolver control section 34 to rotate the revolver of the electric revolver 24 in the negative direction. Then, the processing proceeds to steps S62 and S63.

In steps S62 and S63, as is the case with the processing in steps S52 and S53 in FIG. 7, the control section 35 calculates the target magnification of the electric zoom 21 required to maintain the total magnification of the microscope 12. The control section 35 then causes the electric zoom control section 32 and the motor driving circuit 23 to set the magnification of the electric zoom 21 to the target magnification.

After step S63, the revolver negative rotation process ends. The processing returns to step S13 in FIG. 4.

As described above, the microscope system 11 keeps the total magnification of the microscope 12 obtained after the switching of the objective lens equal to that obtained before the switching. This prevents the user from missing an observation position on the sample, allowing the operability of the microscope system 11 to be improved.

Moreover, when the magnification of the electric zoom 21 falls outside the magnification changeable range, the electric revolver 24 switches the objective lens, eliminating the need for the user to perform an operation of switching the objective lens. Furthermore, the objective lens is automatically switched to allow the total magnification of the microscope 12 to be smoothly changed over a wider range. Thus, the microscope system 11 can be provided which serves to save time and effort required for the user to spend and which can be easily and appropriately operated.

Furthermore, for example, the time required for switching can be shortened by carrying out the processing in step S34 in FIG. 5 to switch the objective lens, while simultaneously (to be exact, immediately after transmission of a command specifying switching of the objective lens) carrying out the processing in steps S35 and S36 to change the magnification of the electric zoom 21.

In the zoom up process illustrated in FIG. 5, the control section 35 detects the magnification of the switched objective lens before determining in step S33 that the total magnification of the microscope 12 can be increased by switching the objective lens. Thus, immediately after determining that the total magnification of the microscope 12 can be increased by switching the objective lens, the control section 35 can determine the target magnification of the electric zoom 21 and consecutively carry out the process of rotating the revolver of the electric revolver 24 and the process of changing the magnification of the electric zoom 21. The above-described control allows the zoom up process to be smoothly carried out, enabling a reduction in the time required for the zoom up process. That is, the time for which the user needs to wait during switching of the objective lens can be shortened.

Furthermore, for example, if the control section 35 can adjust the time required for the electric revolver 24 to rotate the revolver and the time required for the electric zoom 21 to change the magnification to the desired magnification, the control section 35 may controllably set the magnification of the electric zoom 21 to the target magnification before the rotation of the revolver of the electric revolver 24 ends, that is, before the objective lens of the desired magnification is inserted into the observation optical path. Thus, no objective lens is placed in the observation optical path while the electric zoom 21 is changing the magnification. This prevents the display section 16 from displaying images obtained during the change. Therefore, the user can continuously view images with the magnification obtained after the zoom up process kept equal to that obtained before the zoom up process, without viewing any image obtained during a change in magnification made by the electric zoom 21. The user can thus concentrate on the observation. The zoom up process illustrated in FIG. 5 has been described. However, the control section 35 can perform similar control for the zoom down process illustrated in FIG. 6, the revolver positive rotation process illustrated in FIG. 7, and the revolver negative rotation process illustrated in FIG. 8.

Additionally, in the microscope system 11, as illustrated in FIG. 3, the magnifications of the objective lenses installed in the electric revolver 24 are set such that the ranges within which the total magnification is changed as a result of consecutive changes in the magnification of the electric zoom 21 when the plurality of objective lenses are individually used overlap between the objective lenses of adjacent magnifications. Thus, the total magnification of the microscope 12 can be consecutively changed over a wide range.

In the microscope system 11, the control section 35 can control the display of the image on the display section 16. The display section 16 displays images picked up by the image pickup section 15 via the microscope 12. The control section 35 controllably causes the display section 16 to stop displaying images after the electric revolver 24 starts rotation and before the electric revolver 24 stops rotation.

For example, if the electric revolver 24 starts rotating the revolver in step S34 in the flowchart in FIG. 5 (or step S44 in FIG. 6, step S51 in FIG. 7, or step S61 in FIG. 8), then immediately before the rotation, the control section 35 controllably causes the display section 16 to stop displaying the image (live image) being picked up by the image pickup section 15. Then, for example, the control section 35 causes the display section 16 to display a solid black image or consecutively display an image picked up immediately before the rotation of the revolver. Then, after the magnification of the electric zoom 21 is set to the target magnification in step S36 in the flowchart in FIG. 5 (or step S46 in FIG. 6, step S53 in FIG. 7, or step S63 in FIG. 8), the control section 35 controllably causes the display section 16 to resume displaying the live image.

When the control section 35 controls the display of the image by the display section 16 as described above, the display section 16 is prevented from displaying images obtained during a change in the magnification of the electric zoom 21 which change results from switching of the objective lens. Thus, the display section 16 displays images such that the total magnification of the microscope 12 obtained after the switching of the objective lens is kept equal to that obtained before the switching. As a result, the user is more unlikely to miss the sample than when the display section 16 displays images obtained during the change. That is, the user is more unlikely to miss the sample than when the electric zoom 21 is changing the magnification, with the display section 16 temporarily displaying images of a magnification different from that obtained before and after the switching of the objective lens. Therefore, the user can concentrate on observation and make smooth observations.

Moreover, for example, while the display of live images is stopped (for example, while a solid black image is being displayed or the image obtained immediately before the rotation of the revolver is being continuously displayed), the control section 35 may display a message at an end of the display section 16 which message indicates that the magnification of the electric zoom 21 is being changed. This allows the user to understand the reason why the display of live images is stopped and feel less uncomfortable with the stopped display of live images.

In the present embodiment, the microscope 12 and the control box 13 are configured separately from each other. However, the control box 13 may be incorporated into the microscope 12.

Besides the configuration in which the magnification of the electric zoom 21 is changed using the remote commander 14, the following configuration is possible. For example, the control box 13 is configured to provide a communication function such as RS232C or USB, and the control box 13 is connected to a personal computer. The personal computer supplies communication commands to the control box 13 to instruct the control box 13 to perform various operations.

As illustrated in FIG. 2, the remote commander 14 includes the function selector switch 45. The user can operate the function selector switch 45 to appropriately disable the function to maintain the total magnification of the microscope 12. By thus switching the function to maintain the total magnification of the microscope 12, for example, those skilled in the art can more smoothly operate the microscope system 11.

The processes described above with reference to the flowcharts need not necessarily be carried out in a time series manner in accordance with the orders described in the flowcharts and may be executed in parallel or individually (for example, parallel processing or processing based on objects). Furthermore, the program may be processed by one CPU or by a plurality of CPUs in a distributive manner. Moreover, the program executed by the CPU of the control section 35 may be appropriately downloaded into the memory of the control section 35 for updating.

Furthermore, in the present specification, the system refers to the whole apparatus formed of a plurality of devices.

The embodiment of the present invention is not limited to the above-described one. Various changes may be made to the above-described embodiment without departing from the spirit of the present invention.

REFERENCE SIGNS LIST

11 Microscope system, 12 Microscope, 13 Control box, 14 Remote commander, 15 Image pickup section, 16 Display section, 21 Electric zoom, 22 Sensor, 23 Motor driving circuit, 24 Electric revolver, 25 Stop sensor, Address sensor, 27 Motor driving circuit, 31 Electric zoom magnification detecting section, 32 Electric zoom control section, 33 Electric revolver position detecting section, 34 Electric revolver control section, 35 Control section, 41 Zoom up switch, 42 Zoom down switch, 43 Positive rotation switch, 44 Negative rotation switch, 45 Function selector switch, 46 to 48 Magnification setting switches FIG. 3
1 MAGNIFICATION OF ELECTRIC ZOOM
2 MAGNIFICATION OF OBJECTIVE LENS
3 ADDRESS
FIG. 4
S11 STORE MAGNIFICATIONS OF INSTALLED OBJECTIVE LENSES
S12 DETECT ADDRESSES OF OBJECTIVE LENSES
S13 DETECT MAGNIFICATION OF ELECTRIC ZOOM
S14 CALCULATE TOTAL MAGNIFICATION
S15 ZOOM UP?
S16 ZOOM UP PROCESS
S17 ZOOM DOWN?
S18 ZOOM DOWN PROCESS S19 REVOLVER TO BE ROTATED IN POSITIVE DIRECTION?
S20 REVOLVER POSITIVE ROTATION PROCESS
S21 REVOLVER TO BE ROTATED IN NEGATIVE DIRECTION?
S22 REVOLVER NEGATIVE ROTATION PROCESS
FIG. 5
S31 UPPER LIMIT OF ELECTRIC ZOOM?
S32 INCREASE MAGNIFICATION OF ELECTRIC ZOOM
S33 CAN ZOOM UP PROCESS BE CARRIED OUT BY SWITCHING OBJECTIVE LENS?
S37 NOTIFY ERROR MESSAGE TO USER
S34 SWITCH OBJECTIVE LENS
S35 CALCULATE TARGET MAGNIFICATION FOR ELECTRIC ZOOM
S36 CHANGE MAGNIFICATION OF ELECTRIC ZOOM
FIG. 6
S41 LOWER LIMIT OF ELECTRIC ZOOM?
S42 REDUCE MAGNIFICATION OF ELECTRIC ZOOM
S43 CAN ZOOM DOWN PROCESS BE CARRIED OUT BY SWITCHING OBJECTIVE LENS?
FIG. 7
S51 ROTATE REVOLVER IN POSITIVE DIRECTION
FIG. 8
S61 ROTATE REVOLVER IN NEGATIVE DIRECTION

The invention claimed is:

1. A microscope system configured to magnify a sample for observation, the microscope system comprising:
a zoom instructing section for changing a magnification for the sample;
a zoom section for consecutively changing the magnification for the sample within a predetermined magnification changeable range in accordance with an instruction from the zoom instructing section;
a switching section including a plurality of objective lenses of different magnifications and for switching each of the plurality of objective lens into an observation optical path to intermittently change the magnification for the sample;
a switching control section for controlling the switching section such that when one of the plurality of objective lens is placed in the observation optical path, if the zoom instructing section performs an operation of causing the magnification for the sample to be changed and when the magnification for the sample falls outside a magnification changeable range of the zoom section;
a zoom magnification determining section for determining a target magnification of the zoom section required to keep a magnification obtained after the switching of the objective lens equal to the total magnification obtained before the switching of the objective lens; and
a zoom control section for controlling the zoom section such that a magnification of the zoom section is set equal to the target magnification determined by the zoom magnification determining section.

2. The microscope system according to claim 1, further comprising a magnification calculating section configured to calculate a magnification at which the sample is observed, based on the magnification provided by the zoom section and the magnification of the objective lens currently placed in the observation optical path,
wherein the switching control section operates when the zoom instructing section performs an operation of increasing the magnification, to determine whether or not the magnification changed in response to the operation is greater than an upper limit value of the magnification changeable range of the zoom section,
if the switching control section determines that the magnification changed in response to the operation is greater than the upper limit value of the magnification changeable range of the zoom section, the switching control section determines whether or not the switching section includes an objective lens of a higher magnification than the objective lens currently placed in the observation optical path, and
if the switching control section determines that the switching section includes the objective lens of the higher magnification, the switching control section controllably causes the switching section to place the objective lens of the higher magnification in the observation optical path.

3. The microscope system according to claim 1, wherein the switching control section operates when the zoom instructing section performs an operation of reducing the magnification, to determine whether or not the magnification changed in response to the operation is smaller than a lower limit value of the magnification changeable range of the zoom section,
if the switching control section determines that the magnification changed in response to the operation is smaller than the lower limit value of the magnification changeable range of the zoom section, the switching control section determines whether or not the switching section includes an objective lens of a lower magnification than the objective lens currently placed in the observation optical path, and
if the switching control section determines that the switching section includes the objective lens of the lower magnification, the switching control section controllably causes the switching section to place the objective lens of the lower magnification in the observation optical path.

4. The microscope system according to claim 1, wherein the plurality of objective lenses of the switching section are set in such a manner that ranges within which the magnification for the sample is changed as a result of consecutive changes in the magnification of the zoom section when a plurality of objective lenses are individually used overlap between the objective lenses.

5. The microscope system according to claim 1, further comprising:
a display section for displaying an image of the sample picked up via the objective lens and the zoom section;
a switching detecting section for detecting that the switching section has started switching the objective lens; and
a display control section for stopping display of the image on the display section after the switching detecting section detects that the switching of the objective lens is started until the zoom control section finishes changing the magnification of the zoom section.

6. An observation control method for a microscope comprising a zoom section configured to consecutively change a magnification within a predetermined magnification changeable range and a plurality of objective lenses of different magnifications, to magnify a sample for observation, the observation control method comprising:
specifying a zoom magnification causing a magnification for the sample to be changed;
causing the zoom section to consecutively change the magnification for the sample in accordance with the specification of the zoom magnification;

switching an objective lens placed in an observation optical path to intermittently change the magnification for the sample;

switching an objective lens placed in the observation optical path, if an operation of causing the magnification to be changed is performed in response to the specification of the zoom magnification and when the magnification changed in response to the operation falls outside the magnification changeable range of the zoom section;

determining a magnification (target magnification) of the zoom section required to keep a magnification obtained after the switching of the objective lens equal to a magnification obtained before the switching of the objective lens; and controlling the zoom section such that the magnification of the zoom section is set equal to the determined target magnification.

\* \* \* \* \*

UNITED STATES PATENT AND TRADEMARK OFFICE
CERTIFICATE OF CORRECTION

| | |
|---|---|
| PATENT NO. | : 8,379,303 B2 |
| APPLICATION NO. | : 13/077162 |
| DATED | : February 19, 2013 |
| INVENTOR(S) | : Takashi Wakamatsu et al. |

It is certified that error appears in the above-identified patent and that said Letters Patent is hereby corrected as shown below:

In the Claims

Column 19, Line 52, In Claim 1, after "the" delete "total".

Signed and Sealed this
Seventh Day of May, 2013

Teresa Stanek Rea
*Acting Director of the United States Patent and Trademark Office*